United States Patent
Turner et al.

(10) Patent No.: US 12,034,174 B2
(45) Date of Patent: *Jul. 9, 2024

(54) BATTERY PACK WITH THERMAL PROTECTION

(71) Applicant: Inventus Power, Inc., Woodridge, IL (US)

(72) Inventors: Chris Turner, Dublin, OH (US); Steve Wener, Littleton, CO (US)

(73) Assignee: Inventus Power, Inc., Woodridge, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,353

(22) Filed: Nov. 7, 2022

(65) Prior Publication Data

US 2023/0275301 A1    Aug. 31, 2023

Related U.S. Application Data

(63) Continuation of application No. 17/681,688, filed on Feb. 25, 2022.

(51) Int. Cl.
*H01M 50/24* (2021.01)
*H01M 50/124* (2021.01)
*H01M 50/141* (2021.01)

(52) U.S. Cl.
CPC ......... *H01M 50/24* (2021.01); *H01M 50/124* (2021.01); *H01M 50/141* (2021.01)

(58) Field of Classification Search
None
See application file for complete search history.

(56) References Cited

U.S. PATENT DOCUMENTS

| | | |
|---|---|---|
| 6,621,702 B2 | 9/2003 | Elias et al. |
| 6,756,766 B2 | 6/2004 | Miller |
| 8,486,560 B2 | 7/2013 | Tartaglia |
| 8,936,864 B2 | 1/2015 | Yang et al. |

(Continued)

FOREIGN PATENT DOCUMENTS

| | | |
|---|---|---|
| EP | 3262705 A1 | 1/2018 |
| JP | 2006218228 A | 8/2006 |

(Continued)

OTHER PUBLICATIONS

Jul. 26, 2023—(EP) Extended European Search Report and Written Opinion—App EP23158570.4.

*Primary Examiner* — Haixia Zhang
(74) *Attorney, Agent, or Firm* — Banner & Witcoff, Ltd.

(57) ABSTRACT

A battery pack protects the internal battery pack components from the heat, e.g., heat generated during a sterilization process of an autoclave. The battery pack prevents the heat of the autoclave from damaging the battery cells and other electronic components within a battery pack housing. The battery pack may include a multi-layer thermal protection portion lining an inside surface of the walls of the battery pack housing with a combination of materials designed to limit the amount of heat to which the internal components of the battery will be exposed for the duration of a traditional autoclave sterilization cycle. Additionally, the battery pack may include a thermal protection casing around connection elements, such as wires and contacts, between a battery pack contact and the battery cells, to limit the heat rise from the heat of the autoclave in or on the connection elements of the battery pack.

13 Claims, 11 Drawing Sheets

(56) References Cited

U.S. PATENT DOCUMENTS

| | | |
|---|---|---|
| 9,105,950 B2 | 8/2015 | Gadawski et al. |
| 9,114,181 B2 | 8/2015 | Stoddard et al. |
| 9,212,745 B2 | 12/2015 | Kritzer |
| 9,265,847 B2 | 2/2016 | Stoddard et al. |
| 9,312,580 B2 | 4/2016 | Nguyen et al. |
| 9,485,491 B2 | 11/2016 | Yu et al. |
| 9,496,588 B2 | 11/2016 | Nguyen et al. |
| 9,553,346 B2 | 1/2017 | Hermann |
| 9,557,120 B2 | 1/2017 | Grama et al. |
| 9,614,263 B2 | 4/2017 | Yang et al. |
| 9,742,047 B2 | 8/2017 | Ebner et al. |
| 9,966,642 B2 | 5/2018 | Stoddard et al. |
| 10,069,179 B2 | 9/2018 | Murata et al. |
| 10,088,243 B2 | 10/2018 | Grama et al. |
| 10,164,301 B2 | 12/2018 | Al-Hallaj et al. |
| 10,276,843 B2 | 4/2019 | Okutani et al. |
| 10,381,696 B2 | 8/2019 | Pedicini |
| 10,424,821 B2 | 9/2019 | Iyengar et al. |
| 10,446,895 B2 | 10/2019 | Pedicini |
| 10,454,081 B2 | 10/2019 | Song |
| 10,505,237 B2 | 12/2019 | Zhao et al. |
| 10,707,462 B1 | 7/2020 | Lane |
| 10,727,550 B2 | 7/2020 | Toth |
| 10,784,015 B2 | 9/2020 | Kim et al. |
| 11,000,293 B2 | 5/2021 | Macdonald et al. |
| 11,050,101 B2 | 6/2021 | Al-Hallaj et al. |
| 2007/0292751 A1 | 12/2007 | Cherng et al. |
| 2009/0169983 A1 | 7/2009 | Kumar et al. |
| 2010/0028758 A1 | 2/2010 | Eaves et al. |
| 2011/0293986 A1 | 12/2011 | Kozu |
| 2011/0293997 A1 | 12/2011 | Tartaglia |
| 2014/0017118 A1 | 1/2014 | Stoddard et al. |
| 2014/0370354 A1 | 12/2014 | Yang et al. |
| 2016/0043453 A1 | 2/2016 | Ebner et al. |
| 2016/0268653 A1 | 9/2016 | Stoddard et al. |
| 2016/0287265 A1 | 10/2016 | Macdonald et al. |
| 2017/0005371 A1 | 1/2017 | Chidester et al. |
| 2019/0305394 A1 | 10/2019 | Pedicini |
| 2020/0003840 A1 | 1/2020 | Rodriguez et al. |
| 2020/0136209 A1 | 4/2020 | Dede et al. |
| 2020/0303790 A1 | 9/2020 | Campbell et al. |
| 2020/0343495 A1 | 10/2020 | Kritzer et al. |
| 2020/0343608 A1 | 10/2020 | Choi et al. |
| 2021/0077124 A1 | 3/2021 | Macdonald et al. |
| 2021/0203042 A1 | 7/2021 | Toriyama et al. |
| 2021/0288362 A1 | 9/2021 | Churchill |
| 2021/0310750 A1 | 10/2021 | Zaglio et al. |
| 2021/0320345 A1 | 10/2021 | Yoon |
| 2021/0336303 A1 | 10/2021 | Aykol et al. |
| 2021/0351454 A1 | 11/2021 | Vizzini et al. |
| 2021/0367286 A1 | 11/2021 | Guo et al. |

FOREIGN PATENT DOCUMENTS

| | | |
|---|---|---|
| WO | 2004010514 A2 | 1/2004 |
| WO | 20065353 A1 | 1/2006 |
| WO | 21041585 A1 | 3/2021 |
| WO | 21183493 A1 | 9/2021 |

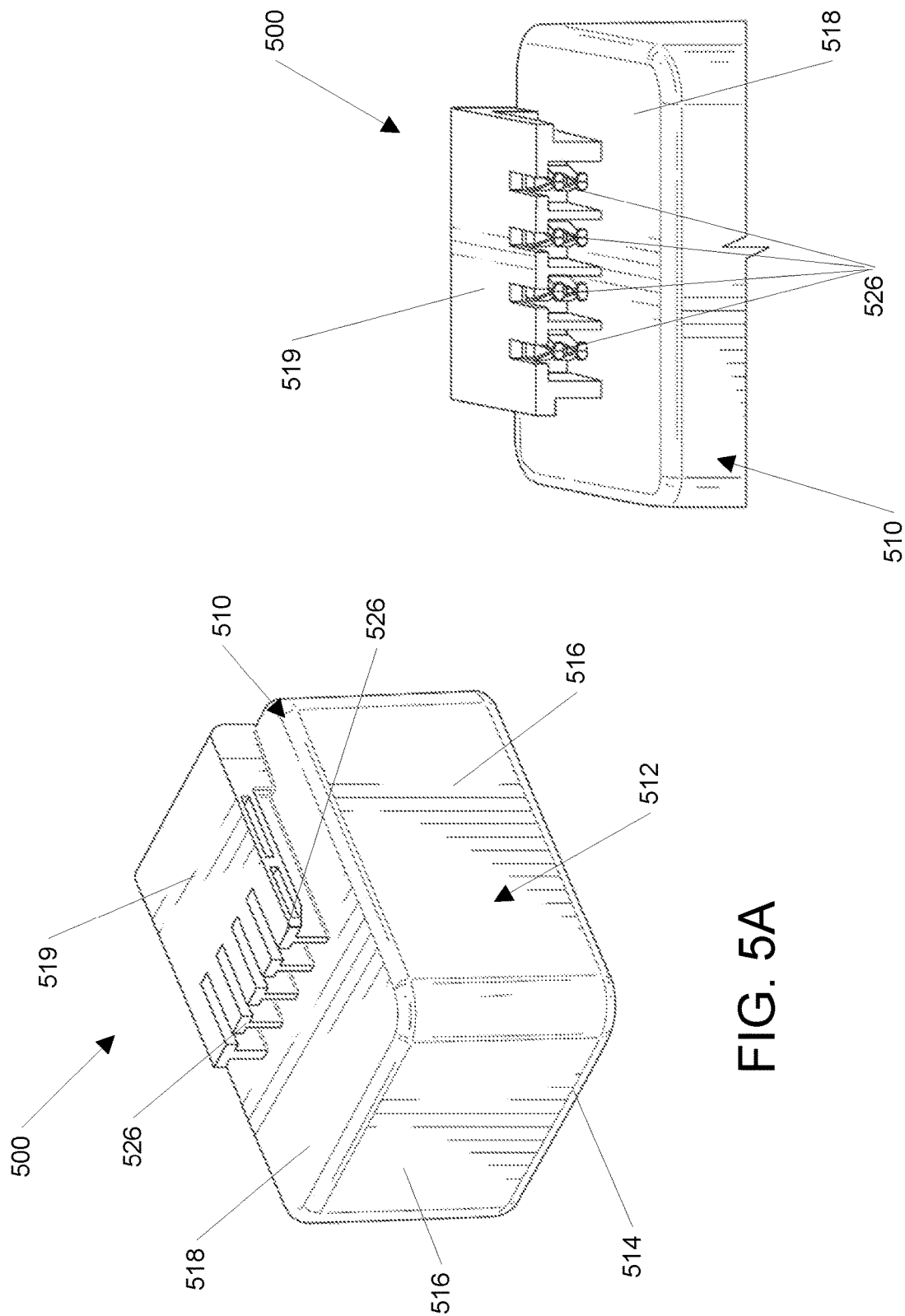

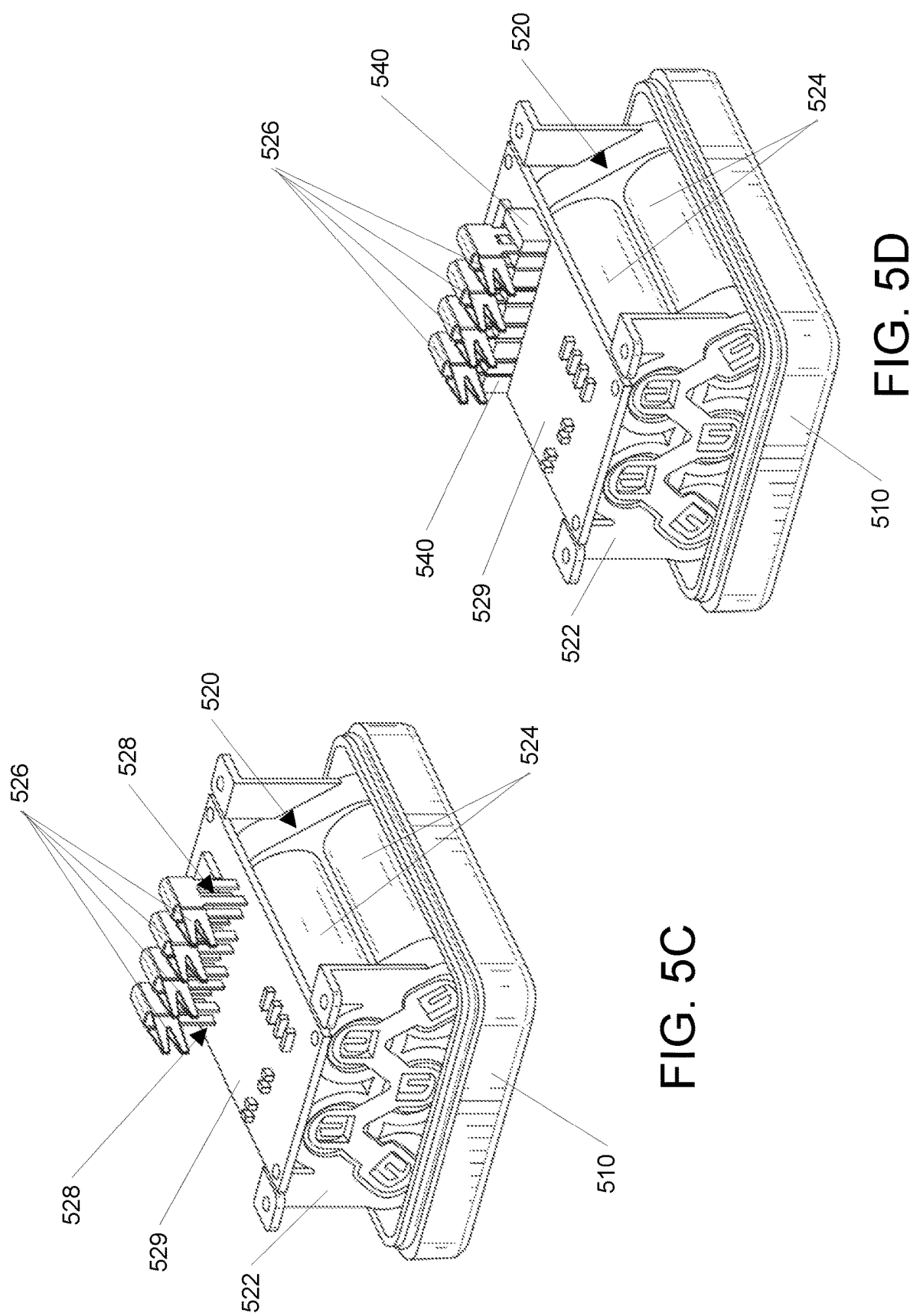

BATTERY PACK WITH THERMAL PROTECTION

CROSS-REFERENCE TO RELATED APPLICATIONS

This application is a continuation of U.S. patent application Ser. No. 17/681,688, filed Feb. 25, 2022. The content of this application is expressly incorporated herein by reference in its entirety for any and all non-limiting purposes.

TECHNICAL FIELD

Aspects described herein generally relate to rechargeable batteries and battery packs. More specifically, aspects of this disclosure relate to rechargeable battery packs and battery systems with thermal protection for a plurality of battery packs/cells inside that may be used in an autoclave and/or other heating vessel.

BACKGROUND

Battery technology has evolved from the nascent era of automation when vehicle batteries were typically large and heavy affairs using lead-acid technology. Battery technology has evolved to provide more electrical energy with less space. For example, Lithium-ion (Li-ion) batteries are quickly replacing regular zinc carbon and lead batteries because Li-ion batteries are smaller and lighter than traditional batteries and can hold charge for up to three times longer than big, heavy traditional batteries. Consequently, Li-ion batteries are finding applications for powering tools, appliances, and vehicles including forklifts, cars, trucks, and so forth. Additionally, Li-ion batteries may be used with medical devices that might be separately sterilized in an autoclave or other heating vessel. In general, Li-ion batteries are susceptible to damage when exposed to excessive heat. Because of this potential for damage, Li-ion batteries have not been readily used in heat sterilization environments. Further, because battery packs use metal wires and/or terminals, exposure of those wires and/or terminals to heat may heat the Li-ion batteries as well, causing further damage to an Li-ion cells in the battery pack.

SUMMARY

A battery pack may comprise a plurality of battery cells. Each battery pack may support battery cells (often Li-ion). As described herein, a battery pack with Li-ion battery cells may limit the heating of the Li-ion battery cells and/or battery modules inside the battery pack's enclosure. Additionally, the battery pack may be configured to limit the heat rise of wires, contact pins, or nickel tabs that connect the battery pack's electrical contacts with a circuit board inside the battery pack enclosure.

In a first aspect, a battery pack may be configured to prevent overheating of internal components when the battery pack is exposed to a sterilization cycle of an autoclave and configured to electrically power an end device. The battery pack may comprise: a battery cell holder to hold a plurality of battery cells; a battery pack housing; a plurality of battery pack contacts; a thermal protection casing for the battery pack contacts; and a thermal protection portion. Each battery cell of the plurality of battery cells may be fixed within the battery cell holder. The plurality of battery cells may be arranged in the battery cell holder in a configuration to form a battery block. The battery pack housing may include a housing cover and a housing base to hold the battery block and internal components of the battery pack. The housing base may comprise four outer walls extending perpendicularly from a base. The plurality of battery pack contacts may be electrically connected to a circuit board with a connection element. The thermal protection casing may be in contact with and enclosing the connection element. The thermal protection casing may be configured to limit a heat rise across the connection element. The plurality of battery pack contacts may be configured to electrically connect to power the end device or electrically connect to charge the battery pack. The thermal protection casing may comprise at least one selected from: one of the following: a phase change material, a heat sinking material, a thermally conductive potting compound, and a combination thereof. The thermal protection portion may comprise a multi-layer portion that encloses the battery block. The thermal protection portion may include a first layer, a second layer, and an air gap between the second layer and the battery block. The first layer may include a ceramic fiber paper applied to an inner surface of the four outer walls, the base, and the housing cover. The second layer may include a phase change material layer applied to the first layer opposite the inner surface of the battery pack housing. The thermal protection portion may prevent overheating of the internal components when the battery pack is exposed to a sterilization cycle for the autoclave.

With another aspect, a method for assembling a battery pack configured to prevent overheating of internal components when the battery pack is exposed to a sterilization cycle of an autoclave and configured to electrically power an end device may comprise: 1) applying a first layer of a thermal protection portion to a plurality of inner surfaces of a battery pack housing that includes a housing cover and a housing base to hold a battery block and internal components of the battery pack; 2) applying a second layer of the thermal protection portion to the first layer opposite the plurality of inner surfaces of the battery pack housing; 3) applying a thermal protective casing in contact with and enclosing a connection element that electrically connects a plurality of battery cells to a plurality of battery pack contacts configured to electrically connect to power the end device or electrically connect to charge the battery pack; 4) adding the plurality of battery cells, a battery block, and internal components to the battery pack housing; and 5) hermetically sealing the battery pack housing to prevent ingress into the battery pack of steam of the autoclave during a sterilization cycle. The first layer may include a ceramic fiber paper. The second layer may include a phase change material layer. The battery block may include a battery cell holder to hold the plurality of battery cells. Each battery cell of the plurality of battery cells may be fixed within the battery cell holder. The plurality of battery cells may be arranged in the battery cell holder in a configuration to form the battery block. The thermal protection portion may prevent overheating of the internal components when the battery pack is exposed to a sterilization cycle for the autoclave. The thermal protective casing may be configured to limit a heat rise across the connection element. The thermal protective casing may comprise at least one selected from: a phase change material, a heat sinking material, a thermally conductive potting compound, and a combination thereof.

BRIEF DESCRIPTION OF THE DRAWINGS

The foregoing summary, as well as the following detailed description of exemplary embodiments, is better understood

FIG. 5A shows a perspective view of another exemplary embodiment of a battery pack with battery pack contacts in accordance with an embodiment.

FIG. 5B shows a top perspective view of the battery pack with battery pack contacts from FIG. 5A in accordance with an embodiment.

FIG. 5C shows a perspective view of internal components of the battery pack with battery pack contacts from FIG. 5A in accordance with an embodiment.

FIG. 5D shows a perspective view of a thermal protection casing of the internal components of the battery pack with battery pack contacts from FIGS. 5A and 5C in accordance with an embodiment.

DETAILED DESCRIPTION

Figure 1A:
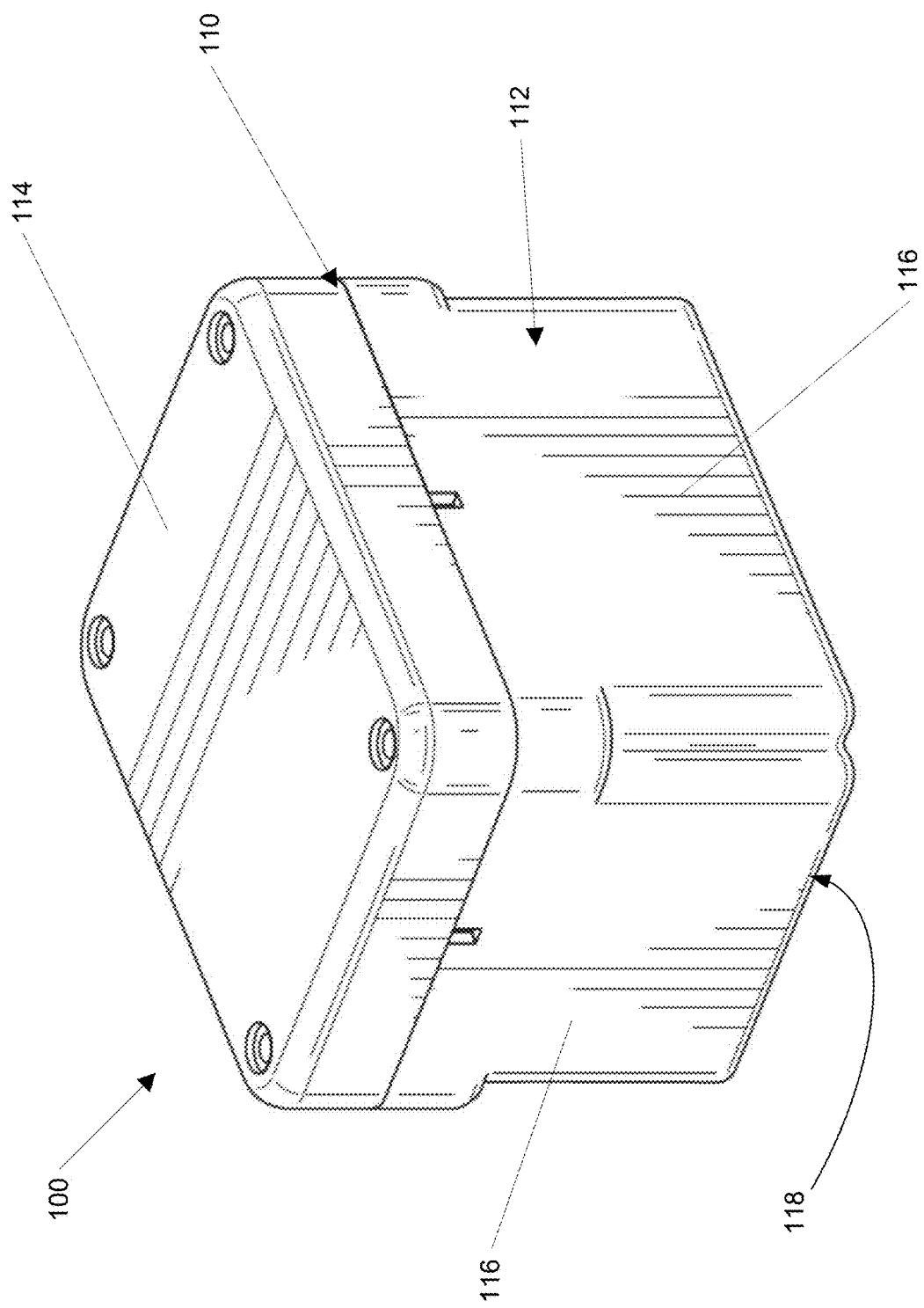
FIG. 1A shows a perspective view of a battery pack in accordance with an embodiment.

According to an aspect of the embodiments, a rechargeable battery (e.g., a Li-ion battery) used for powering equipment (such as medical equipment and/or medical tools) used in an autoclave may include features to protect internal battery pack components from the heat of the autoclave. Generally, the features may include a thermal protection portion lining an inside surface of the walls of a battery pack housing with a combination of materials designed to limit the amount of heat that the internal components of the battery will be exposed for the duration of a traditional autoclave cycle. The battery pack with the thermal protection portion results in safer battery packs with more charge/discharge cycles than other battery packs used in similar applications. Prior to adding the battery cells, circuit boards, and other internal components of the battery pack enclosure, precut ceramic fiber paper shapes may be applied to the inside surfaces of the enclosure. Pouches with a phase change material may then be applied to the surfaces of the ceramic fiber paper. The rest of the components required for the battery pack may then be added to the enclosure. The battery pack may be manufactured such that the enclosure and battery pack is hermetically sealed to prevent ingress of the steam of the autoclave during a sterilization cycle.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. Throughout the specification, expression "at least one of a, b, and c" may include 'a only', 'b only', 'c only', 'a and b', 'a and c', 'b and c', and/or 'all of a, b, and c'.

FIGS. 1A-3 show an exemplary battery pack 100. The battery pack 100 may be a rechargeable battery pack with a battery block 120 with one or more battery cells 124. The rechargeable battery pack 100 may be utilized to power or provide power to an end device, where the end device may be subjected to heat and pressure, for instance, in an autoclave. Examples of end devices that are sterilized in an autoclave include medical devices and/or medical tools. The end device may be a drill, saw, light, surgical stapler, and/or any powered device that may be sterilized in an autoclave. The rechargeable battery pack 100 may be housed within the end device, mounted to the end device, or externally situated with respect to end device. The battery pack 100 may be utilized in combination with other battery packs.

The battery pack 100 may include features that protect the internal battery pack components from the heat of the autoclave. The battery pack 100 may prevent the heat of the autoclave from damaging the battery cells 124 and other electronic internal components within a battery pack housing 110. The battery pack 100 may be configured to prevent overheating of internal components when the battery pack 100 is exposed to a sterilization cycle of an autoclave and configured to electrically power an end device. The thermal/heat protection, e.g., that prevents the battery cells 124 and internal components from overheating, may preserve a charge storage capacity of the battery cells 124 of the battery block 120 and/or may promote battery pack safety (e.g., by limiting the likelihood of a catastrophic failure of one or more of the battery cells 124).

When a Li-ion battery cell 124 undergoes a catastrophic failure, the battery cell 124 may emit flaming ejecta under pressure. This is known as "thermal runaway." The flames from the battery cell 124 undergoing such an energetic failure may be extremely hot and readily damage or destroy other components within the battery pack 100. Furthermore, the flaming ejecta emitted from the battery cell 124 can burn through the walls of the battery pack's 100 plastic enclosure or escape through seams or other openings in a sheet metal enclosure and damage components of the host device. Additionally, when one Li-ion battery cell 124 in a multi-cell battery pack 100 undergoes flaming thermal runaway it can cause other battery cells 124 within the battery pack 100 to rapidly overheat and also experience thermal runaway making the event magnitudes more destructive for both the battery pack 100 and the host device. The invention greatly diminishes the possibility of cell thermal runaway. In other embodiments, the battery pack 100 may be configured to prevent overheating of internal components and the battery cells 124 when the battery pack 100 is exposed to any heat from other sources other than an autoclave, such as sun, electrical heat, fire, etc.

The battery pack 100 may include a battery pack housing 110, one or more battery blocks 120 enclosed in the battery pack housing 110, and a thermal protection portion 130. The thermal protection portion 130 may be a multi-layer portion located between the battery block 120 and the battery pack housing 110. The thermal protection portion 130 may surround at least a portion of the battery block 120 and/or line the internal walls of the battery pack housing 110.

The battery pack housing 110 may include a housing base 112 and a housing cover 114 that engages with the housing base 112. The battery pack housing 110 may house one or more battery blocks 120. The battery pack housing 110 and the housing base 112 may be defined by an outer enclosure that comprises four outer walls 116 extending approximately perpendicularly from a base bottom 118. The battery pack 100 and the battery pack housing 110 may be various sizes and shapes without departing from the invention. The battery pack housing 110 with the housing base 112 and the housing cover 114 may include a hermetic seal. The hermetic seal may include various seals and closures that create a hermetically-sealed battery pack 100 that prevents the ingress of the steam of the autoclave during a sterilization cycle. The steam may be saturated steam, superheated steam or other steams known and used in an autoclave or heating vessel. The hermetic seal may be any type of sealing that makes the battery pack 100 airtight, thereby preventing the passage of air, oxygen, steam, or other gases. The battery pack housing 110 may be a plastic material. Other materials may be utilized for the battery pack housing 110.

Figure 2:
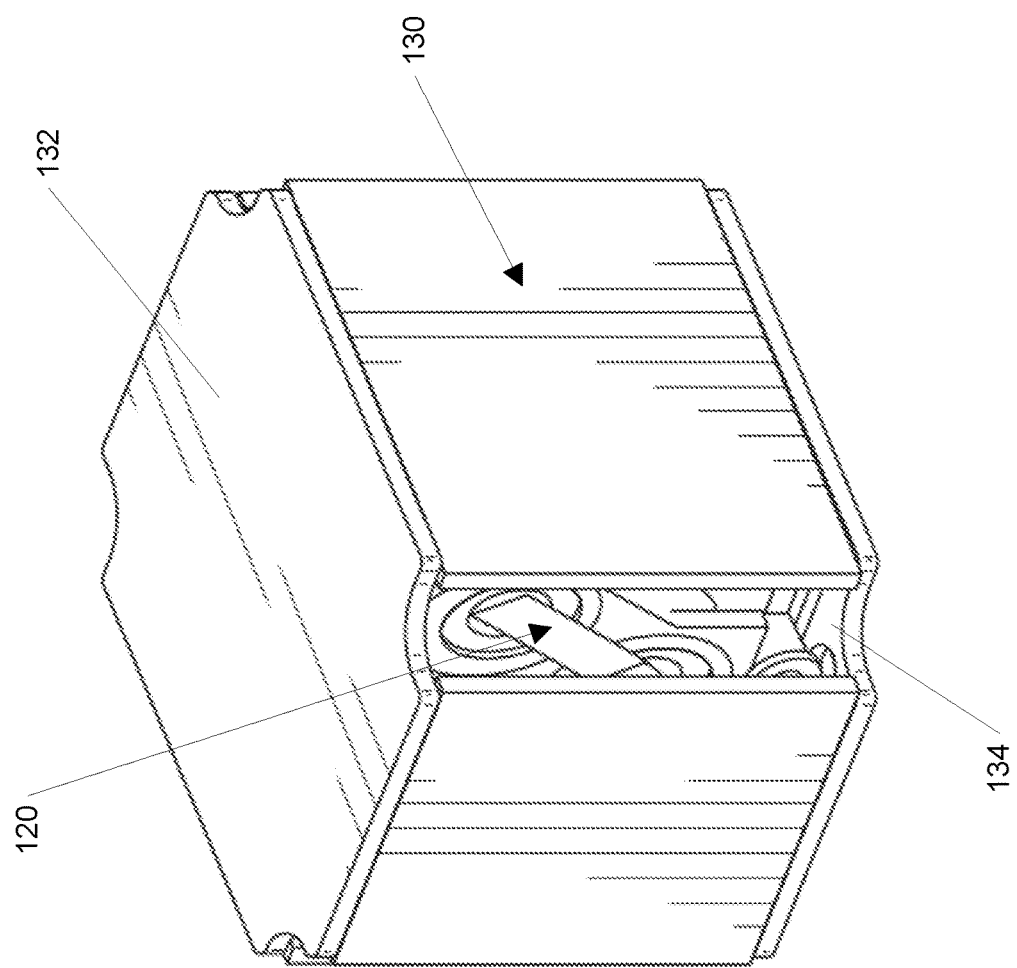
FIG. 2 shows a perspective view of a battery block with a thermal protection layer from the battery pack from FIG. 1A in accordance with an embodiment.
Figure 3:
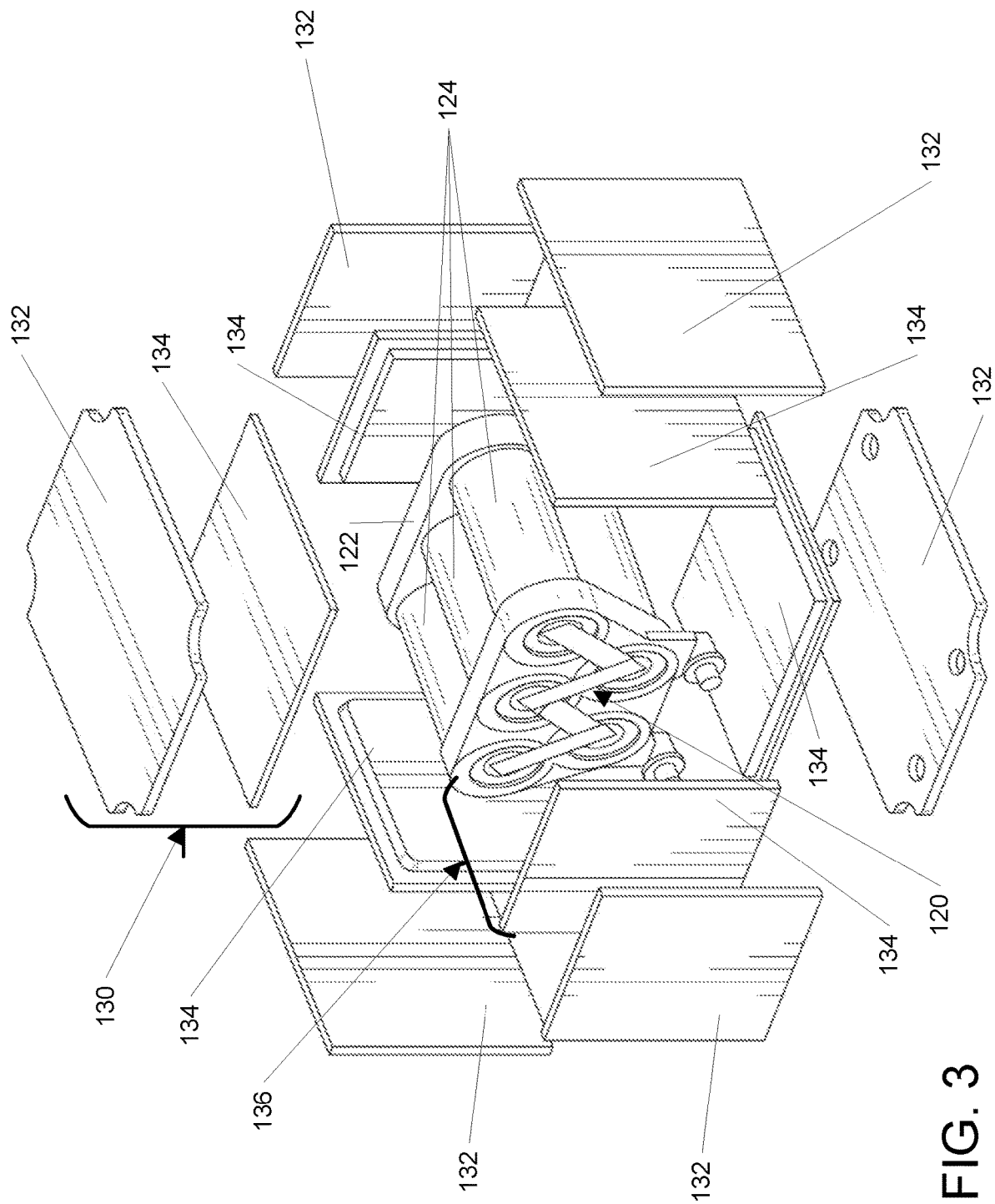
FIG. 3 shows an exploded perspective view of the battery block and the thermal protection layer from FIG. 2 in accordance with an embodiment.

Referring to FIGS. 2 and 3, the battery pack 100 may include one or more battery blocks 120 to provide power for the battery pack 100. The battery block 120 may include one or more battery cell holders 122 that hold individual battery cells 124. FIG. 2 shows the battery block 120 with a thermal protection layer 130, while FIG. 3 shows an exploded view of the battery block 120 and the thermal protection layer 130. Each of the battery cell holders 122 with the battery cells 124 may make up various battery blocks 120. The battery pack 100 may include various battery blocks 120 that fit within the battery pack housing 110 of the battery pack 100. The battery pack housing 110 may include a plurality of battery blocks 120 electrically connected to provide power for the battery pack 100.

FIG. 3 illustrates a battery cell holder 122 holding the battery cells 124. The battery cell 124 may be a cylindrical battery or other shapes that may be known and used in the art. The battery cells 124 may be arranged in the battery cell holder 122 in a parallel configuration with their ends faces arranged in the same plane to form individualized battery blocks 120 within the battery cell holder 122. The battery cells 124 may be a lithium ion battery (Li-ion). The battery cells 124 may be other forms of batteries.

FIGS. 2 and 3 show a thermal protection portion 130 to protect internal battery pack components from the heat of an autoclave. The thermal protection portion 130 may be lined on the inside surfaces of the walls 116 of the battery pack housing 110. The thermal protection portion 130 may include a combination of materials to limit the heat that the internal components of the battery block 120 when subjected to sterilization during an autoclave heating cycle. will be exposed for the duration of the autoclave cycle. The thermal protection portion 130 may be a multi-layer portion located between the battery block 120 and the battery pack housing 110. The thermal protection portion 130 may include a first layer 132, a second layer 134, and an air gap 136 located between second layer 134 and the battery block 120 and the battery cells 124. In other embodiments, additional heat protection layers may be utilized without departing from the scope of the invention.

As illustrated in FIG. 3, the thermal protection portion 130 may include portions that surround the entire battery block 120 and the battery pack housing 110. The thermal protection portion 130 may cover or line one or more of the top of the battery block 120, the bottom of the battery block 120, and/or each of the sides of the battery block 120 and the walls 116 of the battery pack housing 110. One or more components of the thermal protection portion 130, such as the first layer 132, the second layer 134, and/or the air gap 136, may be utilized around a portion of or the entire battery block 120. As shown in FIG. 3, the thermal protection portion 130 may include up to six portions of the first layer 132, the second layer 134, and the air gap 136 surrounding the battery block 120.

As illustrated in FIG. 3, the first layer 132 may be located adjacent to an inner portion or an inner wall surface of the battery pack housing 110. The first layer 132 may applied to the inner surfaces of the battery pack housing 110. The first layer 132 may include a ceramic fiber paper. The first layer 132 may include any material with exceptionally high heat tolerance and can be used in place of ceramic fiber paper, i.e., ceramic fiber cloth, silica fiber felt, fiberglass cloth, mica paper, graphite felt and/or more could all be used for this first layer 132. For example, the first layer 132 may be precut ceramic fiber paper applied to the inner surfaces of the battery pack housing 110. The first layer 132 may be other heat absorbing materials known and used in the art. The first layer 132 may include any thickness that will slow the rate the heat enters the battery pack housing 110 and battery pack 100. Generally, the thicker the first layer 132, the better heat insulation. For example, a thickness of approximately 1/16" (or 0.062" or 1.57 mm) or between a range of 1/32" to 2" may be utilized for the first layer 132.

As further illustrated in FIG. 3, the second layer 134 may be located adjacent to the first layer 132 between the first layer 132 and the battery block 120. The second layer 134 may include a phase change material. The phase change material may be available in several forms. The phase change material can be contained in foil packets, exist as a putty or paste, or be a solid shape. In whatever form the phase change material is applied, it is important that that the phase change material, or the material in which it contained, is not electrically conductive. This will ensure that the phase change material will not cause any electrical short circuits within the battery pack 100. The phase change material of the second layer 134 may be contained within one or more pouches or foil packets. The pouches or foil packets may include a heat absorbing material, such as the phase change material. The pouches or foil packets with the phase change material may be applied to the surfaces of the first layer 132. The second layer 134 may include any thickness that will slow the rate the heat enters the battery pack housing 110, the first layer 132, and the battery pack 100. Generally, the thicker the second layer 134, the more phase change material, and the better heat insulation. For example, a thickness of approximately 0.163 inches or 4.125 mm or between a range of 1/32" to 2" may be utilized for the second layer 134.

Figure 1B:
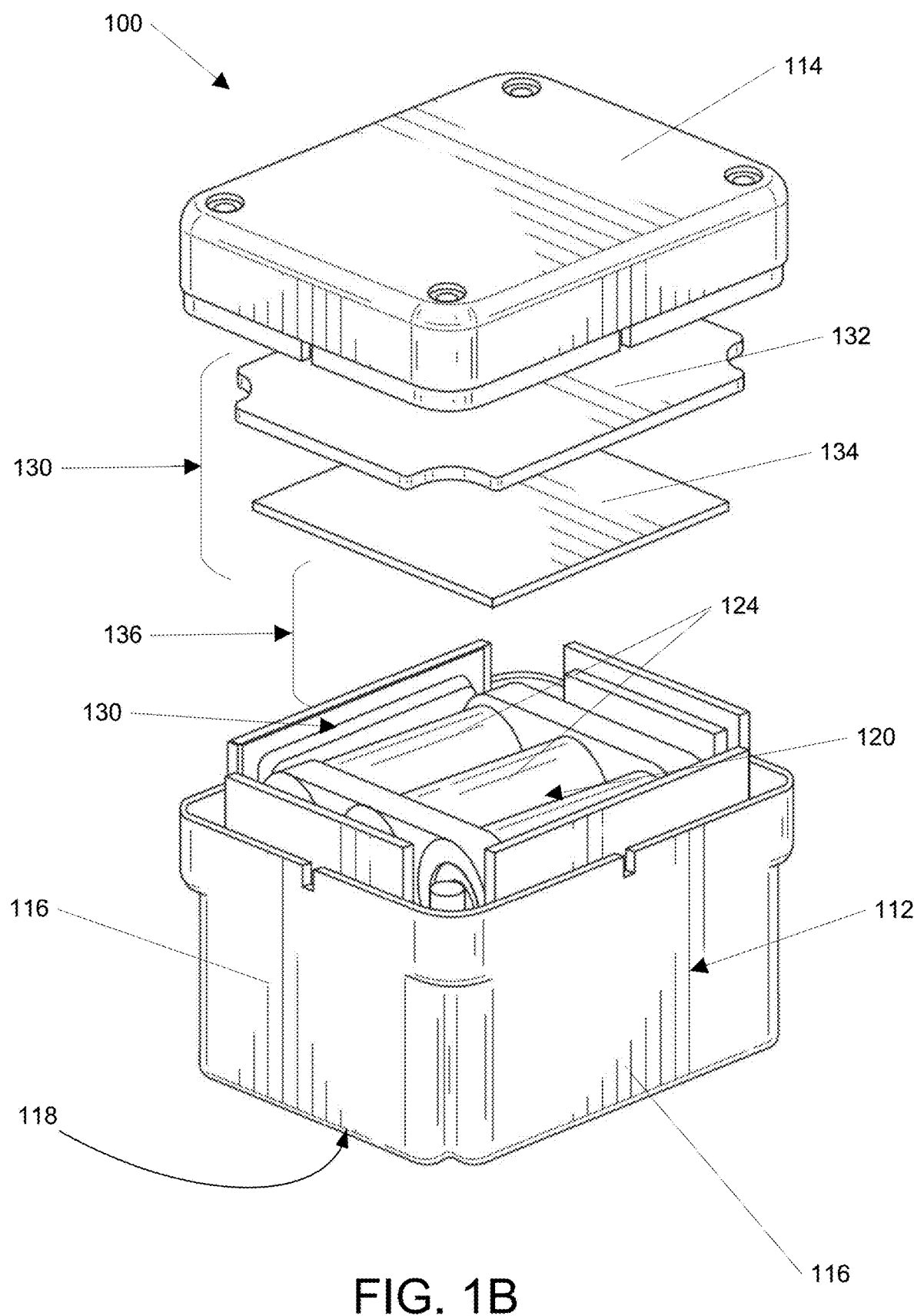
FIG. 1B shows an exploded perspective view of the battery pack from FIG. 1A in accordance with an embodiment.

Additionally, as illustrated in FIGS. 1B and 3, an air gap 136 may be provided between the battery block 120 and the second layer 134 with the pouches and the phase change material. The air gap 136 may provide additional thermal protection to the battery block 120 and the battery cells 124. The distance of the air gap 136 between the battery block 120 and the second layer 134 may be variable and specific to the application, such as based on the maximum size of the battery pack 100 that the application requires. The configuration using a multi-layer thermal protection portion 130 with a first layer 132 of a ceramic fiber paper, a second layer 134 of a phase change material, and an air gap 136 provides protection of the internal battery pack components from the heat of an autoclave cycle.

According to another aspect of the embodiments as illustrated in FIGS. 4A-6D, a rechargeable battery used for powering equipment (such as medical equipment and/or medical tools) used in an autoclave may include a thermal protection casing to limit the heat rise from the heat of the autoclave in or on connections elements, such as wires and contacts, in the battery pack. FIGS. 4A-6D illustrate various embodiments of a battery pack that includes a thermal protection casing. The thermal protection casing may limit the heat rise across wires, contact pins, or nickel tabs that connect the battery pack contacts with the circuit board inside the battery pack enclosure. The thermal protection casing may effectively protect the integrated circuits (ICs) on the circuit board and may help preserve the capacity of the battery cells within the battery pack. The thermal protection casing may be a thermal protection shell, sheath, or sleeve for the wires, contact pins, or nickel tabs without departing from embodiments of the invention. Generally, the thermal protection casing may include a phase change material, a heat sinking material, a thermally conductive potting compound, or other heat absorbing material (or any combination thereof), in contact with the wires, contact pins, or nickel tabs that connect the battery pack contacts to the circuit board within the battery pack enclosure to limit the heat rise of these components during an autoclave cycle.

FIGS. 4A-4D illustrate an embodiment of a battery pack 400 used in an autoclave that includes a thermal protection casing 440 to limit the heat rise from the heat of the autoclave in or on wires in the battery pack 400. For the embodiment of FIGS. 4A-4D, the features of the battery pack 400 are referred to using similar reference numbers under the "4XX" series of reference numerals, rather than "1XX" as used for the battery pack 100 in FIGS. 1A-3. A "4XX" feature may be similar to "1XX" feature (e.g., features that only differ by appended letter may be similar). Accordingly, certain features of the battery pack 400 that were already described above with respect to the battery pack 100 of FIGS. 1A-3 may be described in lesser detail, or may not be described at all. Further, any combination of the features of the battery pack 100 may be utilized with the battery pack 400. Vice versa, any combination of the features of the battery pack 400 may be utilized with the battery pack 100.

The battery pack 400 may include a battery pack housing 410 and one or more battery blocks 420 enclosed in the battery pack housing 410. The battery pack housing 410 may include a housing base 412 and a housing cover 414 that engages with the housing base 412. The battery pack housing 410 may house one or more battery blocks 420. The battery pack housing 410 and the housing base 412 may be defined by an outer enclosure that comprises four outer walls 416 extending approximately perpendicularly from a base bottom 418. The battery pack housing 410 with the housing base 412 and the housing cover 414 may include a hermetic seal. The hermetic seal may include various seals and closures that create a hermitically-sealed battery pack 400 that prevents the ingress of the steam of the autoclave during a sterilization cycle. The battery pack housing 410 may be a plastic material. Other materials may be utilized for the battery pack housing 410.

Figure 4A:
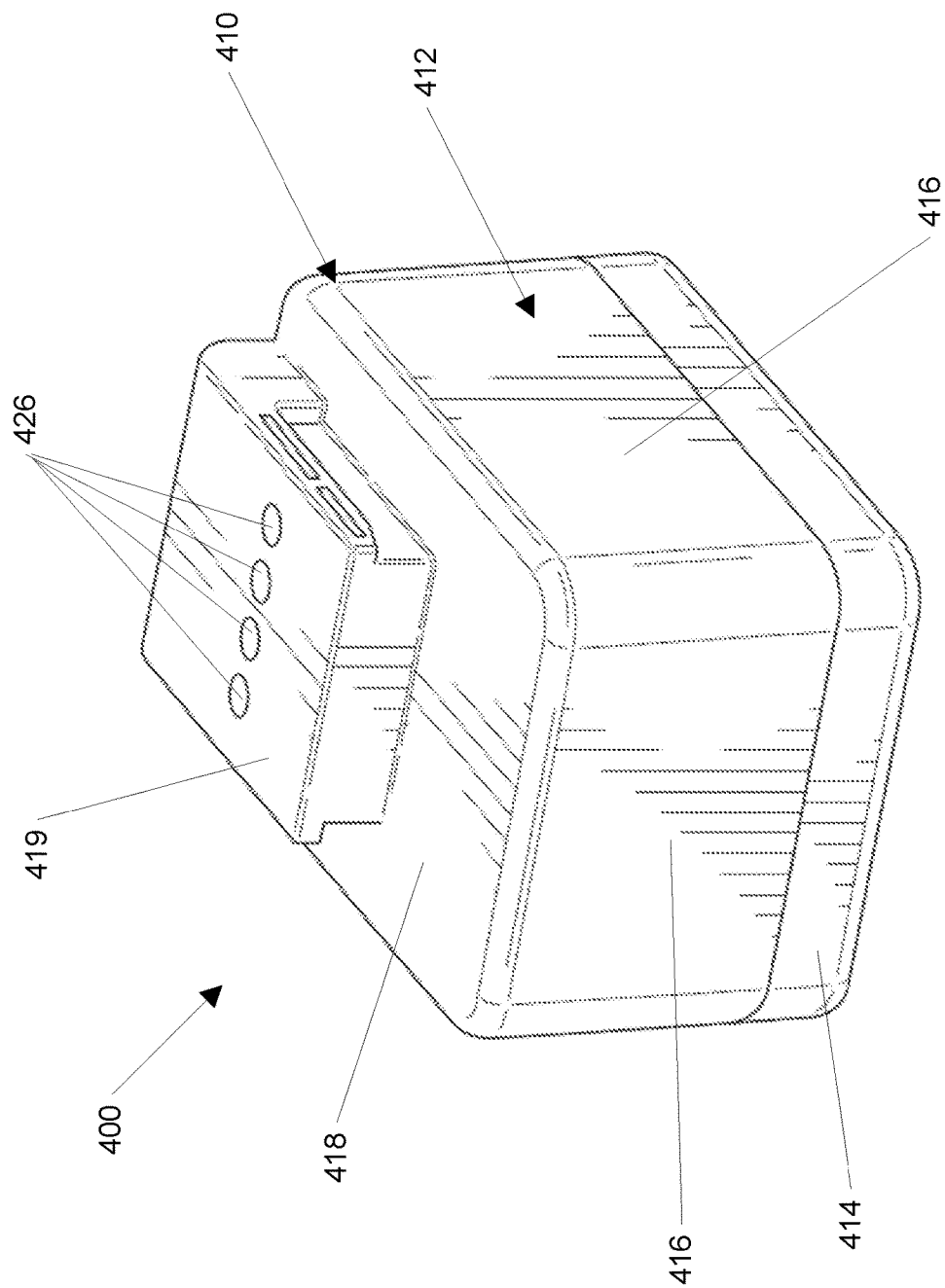
FIG. 4A shows a perspective view of an exemplary embodiment of a battery pack with battery pack contacts in accordance with an embodiment.
Figure 6A:
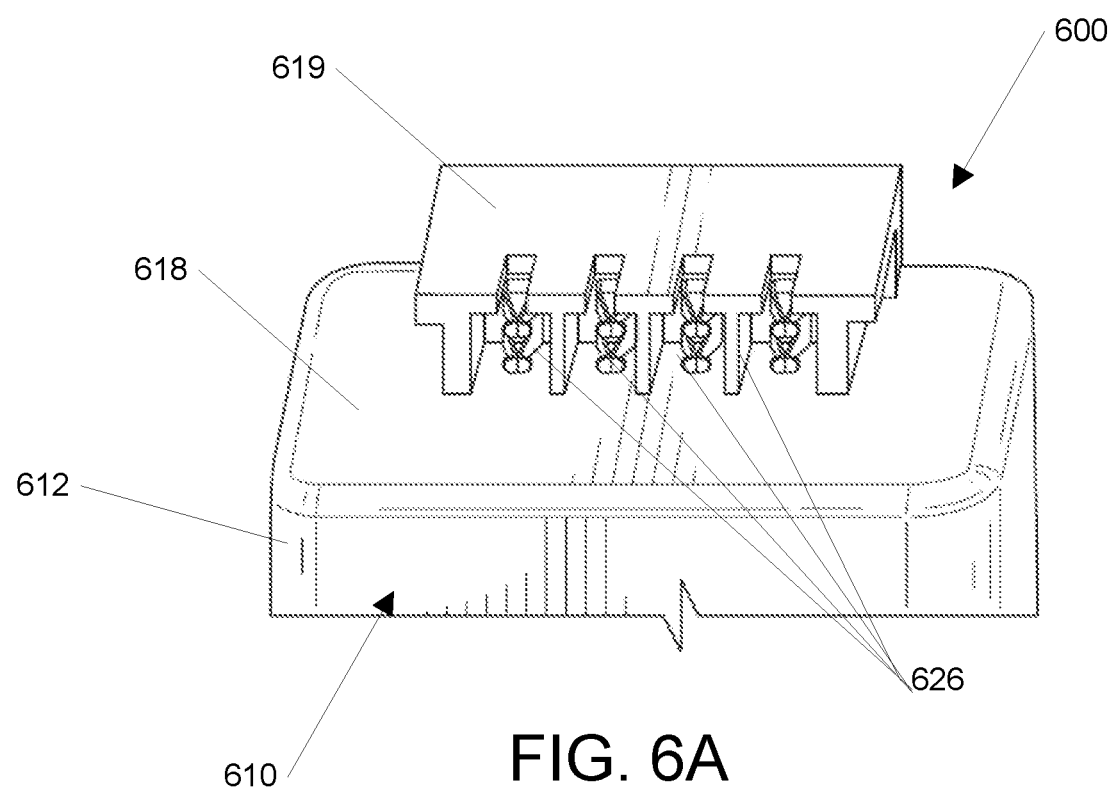
FIG. 6A shows a top perspective view of another exemplary embodiment of a battery pack with battery pack contacts in accordance with an embodiment.

As illustrated in FIG. 4A, the base bottom 418 of the housing base 412 may include a battery pack contact mount 419. The battery pack contact mount 419 may include one or more battery pack contacts 426. The battery pack contacts 426 may protrude and extend from the battery pack contact mount 419 to electrically connect to power an end device. The battery pack contacts 426 may also be utilized to electrically connect to charge the battery pack 400. The battery pack contacts 426 may include various structures known and used in the art, such as tabs (as illustrated in FIG. 4A), clip contacts (as illustrated in FIG. 5A), contact pins (as illustrated in FIG. 6A), and/or other connectors or electrical contact configurations typically used with rechargeable Li-ion battery packs.

Figure 4C:
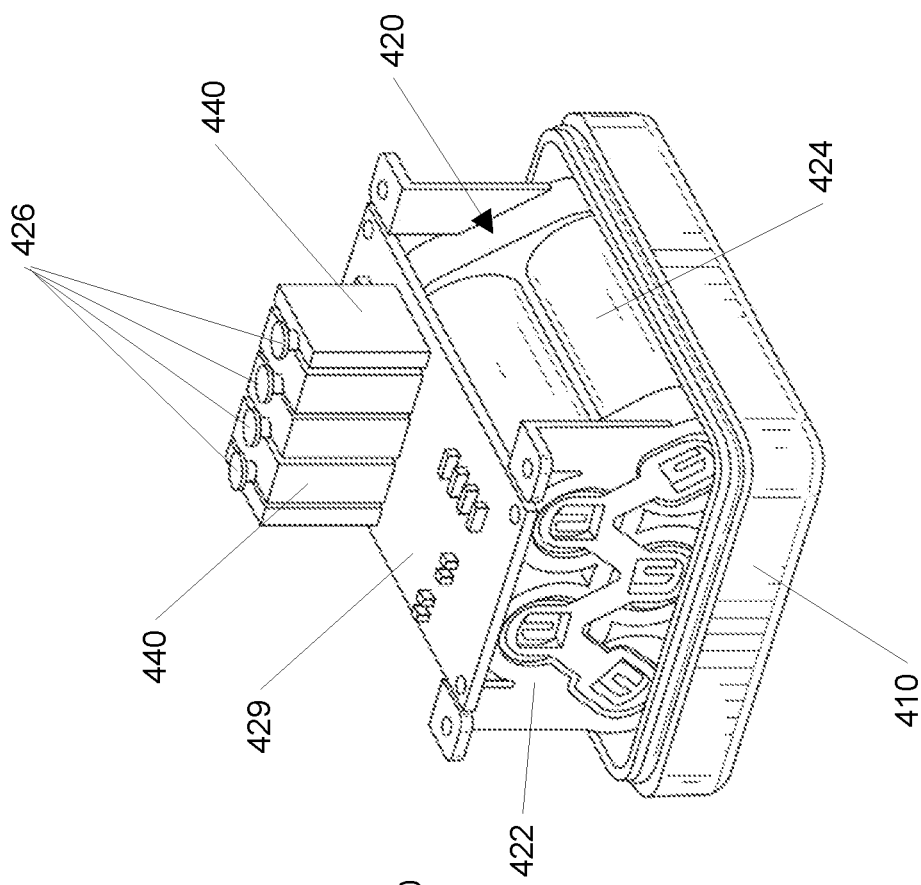
FIG. 4C shows a perspective view of a thermal protection casing of the internal components of the battery pack with battery pack contacts from FIGS. 4A and 4B in accordance with an embodiment.
Figure 4B:
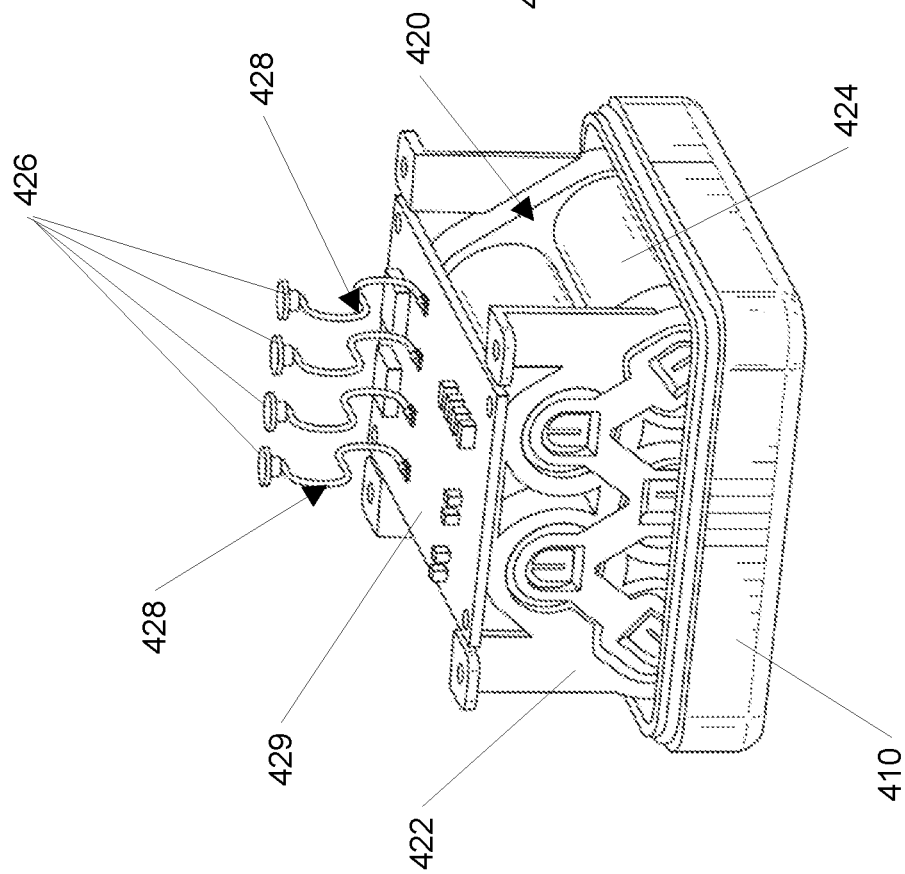
FIG. 4B shows a perspective view of internal components of the battery pack with battery pack contacts from FIG. 4A in accordance with an embodiment.

As illustrated in FIG. 4B, each of the battery pack contacts 426 may include a connection element or wire 428 leading from each of the battery pack contacts 426 to a circuit board 429. The circuit board 429 may be electrically connected to the battery block 420 and battery cells 424. The wire 428 may electrically connect the battery pack contacts 426 to the circuit board 429 inside the battery pack housing 410.

As further illustrated in FIG. 4C, the battery pack 400 may include a thermal protection casing 440. The thermal protection casing 440 may be in contact with one or more of the wires 428 leading from the battery pack contacts 426 to the circuit board 429. The thermal protection casing 440 may comprise one or more of: a phase change material, a heat sinking material, thermally conductive potting compound, or other heat absorbing material, or any combination thereof. The thermal protection casing 440 may limit the heat rise across the wires 428 that connect the battery pack contacts 426 with the circuit board 429 inside the battery pack housing 410. The thermal protection casing 440 may effectively protect the integrated circuits on the circuit board 429 and may help preserve the capacity of the battery cells 424 within the battery pack 400.

FIGS. 5A-5D illustrate another embodiment of a battery pack 500 used in an autoclave that includes a thermal protection casing 540 to limit the heat rise from the heat of the autoclave in or on contacts in the battery pack 500. For the embodiment of FIGS. 5A-5D, the features of the battery pack 500 are referred to using similar reference numbers under the "5XX" series of reference numerals, rather than "1XX" as used for the battery pack 100 in FIGS. 1A-3 and "4XX" as used for the battery pack 400 in FIGS. 4A-4D. A "5XX" feature may be similar to "1XX" feature and "4XX" feature (e.g., features that only differ by appended letter may be similar). Accordingly, certain features of the battery pack 500 that were already described above with respect to the battery pack 100 of FIGS. 1A-3 and the battery pack 400 of FIGS. 4A-4D may be described in lesser detail, or may not be described at all.

Further, any combination of the features of the battery pack 100 and the battery pack 400 may be utilized with the battery pack 500. Vice versa, any combination of the features of the battery pack 500 may be utilized with the battery pack 100 and the battery pack 400.

The battery pack 500 may include a battery pack housing 510 and one or more battery blocks 520 enclosed in the battery pack housing 510. The battery pack housing 510 may include a housing base 512 and a housing cover 514 that engages with the housing base 512. The battery pack housing 510 may house one or more battery blocks 520. The battery pack housing 510 and the housing base 512 may be defined by an outer enclosure that comprises four outer walls 516 extending approximately perpendicularly from a base bottom 518. The battery pack housing 510 with the housing base 512 and the housing cover 514 may include a hermetic seal. The hermetic seal may include various seals and closures that create a hermetically-sealed battery pack 500 that prevents the ingress of the steam of the autoclave during a sterilization cycle. The battery pack housing 510 may be a plastic material. Other materials may be utilized for the battery pack housing 510.

As illustrated in FIGS. 5A and 5B, the base bottom 518 of the housing base 512 may include a battery pack contact mount 519. The battery pack contact mount 519 may include one or more battery pack contacts 526. The battery pack contacts 526 may protrude and extend from the battery pack contact mount 519 to electrically connect to power an end device. The battery pack contacts 526 may also be utilized to electrically connect to charge the battery pack 500. The battery pack contacts 526 may include various structures known and used in the art, such as tabs (as illustrated in FIG. 4A), clip contacts (as illustrated in FIGS. 5A and 5B), contact pins (as illustrated in FIG. 6A), and/or other connectors or electrical contact configurations typically used with rechargeable Li-ion battery packs.

As illustrated in FIG. 5C, each of the battery pack contacts 526 may include a connection element or clip contact 528 leading from each of the battery pack contacts 526 to a circuit board 529. The circuit board 529 may be electrically connected to the battery block 520 and battery cells 524. The clip contact 528 may electrically connect the battery pack contacts 526 to the circuit board 529 inside the battery pack housing 510.

As further illustrated in FIG. 5D, the battery pack 500 may include a thermal protection casing 540. The thermal protection casing 540 may be in contact with one or more of the clip contacts 528 leading from the battery pack contacts 526 to the circuit board 529. The thermal protection casing 540 may comprise one or more of: a phase change material, a heat sinking material, thermally conductive potting compound, or other heat absorbing material, or any combination thereof. The thermal protection casing 540 may limit the heat rise across the clip contacts 528 that connect the battery pack contacts 526 with the circuit board 529 inside the battery pack housing 510. The thermal protection casing 540 may effectively protect the integrated circuits on the circuit board 529 and may help preserve the capacity of the battery cells 524 within the battery pack 500.

FIGS. 6A-6D illustrate another embodiment of a battery pack 600 used in an autoclave that includes a thermal protection casing 640 to limit the heat rise from the heat of the autoclave in or on contacts in the battery pack 600. For the embodiment of FIGS. 6A-6D, the features of the battery pack 600 are referred to using similar reference numbers under the "6XX" series of reference numerals, rather than "1XX" as used for the battery pack 100 in FIGS. 1A-3, "4XX" as used for the battery pack 400 in FIGS. 4A-4D, and "5XX" as used for the battery pack 500 in FIGS. 5A-5D. A "6XX" feature may be similar to "1XX" feature "4XX" feature, and "5XX" feature (e.g., features that only differ by appended letter may be similar). Accordingly, certain features of the battery pack 600 that were already described above with respect to the battery pack 100 of FIGS. 1A-3, the battery pack 400 of FIGS. 4A-4D, and the battery pack 500 of FIGS. 5A-5D may be described in lesser detail, or may not be described at all. Further, any combination of the features of the battery pack 100, the battery pack 400, and the battery pack 500 may be utilized with the battery pack 600. Vice versa, any combination of the features of the battery pack 600 may be utilized with the battery pack 100, the battery pack 400, and the battery pack 500.

The battery pack 600 may include a battery pack housing 610 and one or more battery blocks enclosed in the battery pack housing 610. The battery pack housing 610 may include a housing base 612 and a housing cover that engages with the housing base 612. The battery pack housing 610 may house one or more battery blocks. The battery pack housing 610 may be a plastic material. Other materials may be utilized for the battery pack housing 610.

As illustrated in FIG. 6A, the base bottom 618 of the housing base 612 may include a battery pack contact mount 619. The battery pack contact mount 619 may include one or more battery pack contacts 626. The battery pack contacts 626 may protrude and extend from the battery pack contact mount 619 to electrically connect to power an end device. The battery pack contacts 626 may also be utilized to electrically connect to charge the battery pack 600. The battery pack contacts 626 may include various structures known and used in the art, such as tabs (as illustrated in FIG. 4A), clip contacts (as illustrated in FIGS. 5A and 5B), contact pins (as illustrated in FIG. 6A), and/or other connectors or electrical contact configurations typically used with rechargeable Li-ion battery packs.

Figure 6B:
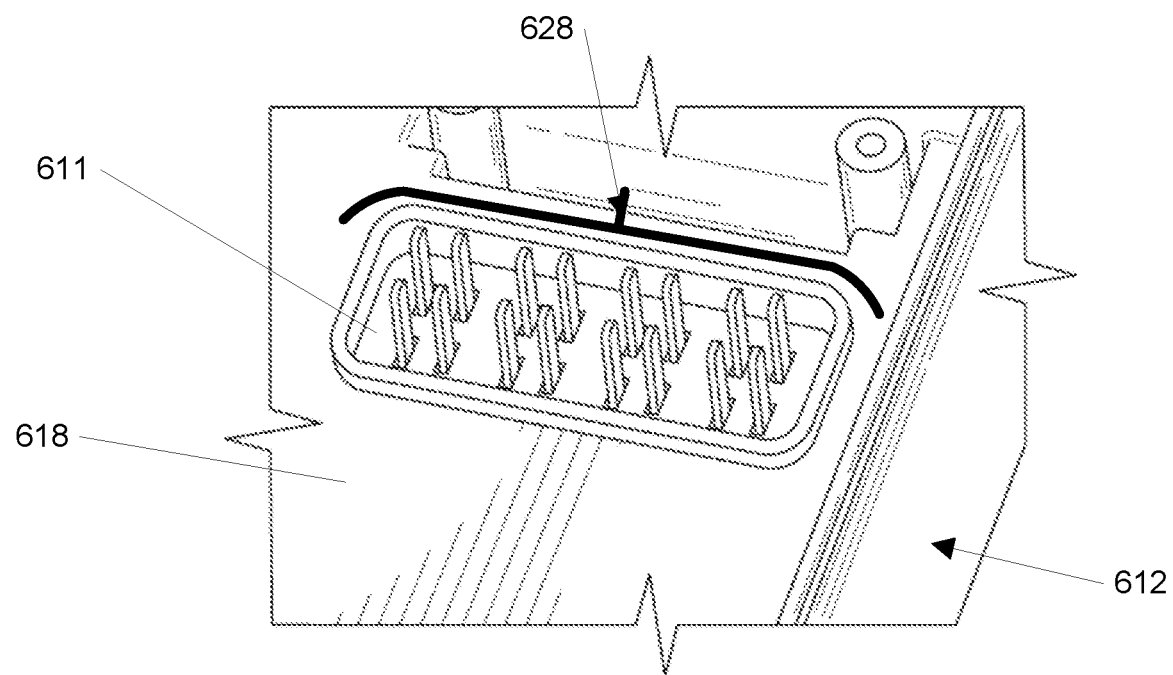
FIG. 6B shows a perspective detail view of internal components of the battery pack with battery pack contacts from FIG. 6A in accordance with an embodiment.

As illustrated in FIG. 6B, the battery pack contacts 626 may each include a connection element or one or more contact pins 628 leading from each of the battery pack contacts 626 to a circuit board. The one or more contact pins 628 may penetrate a wall 611 of the battery pack housing 610. The one or more contact pins 628 may electrically connect the battery pack contacts 626 to the circuit board inside the battery pack housing 610.

Figure 6C:
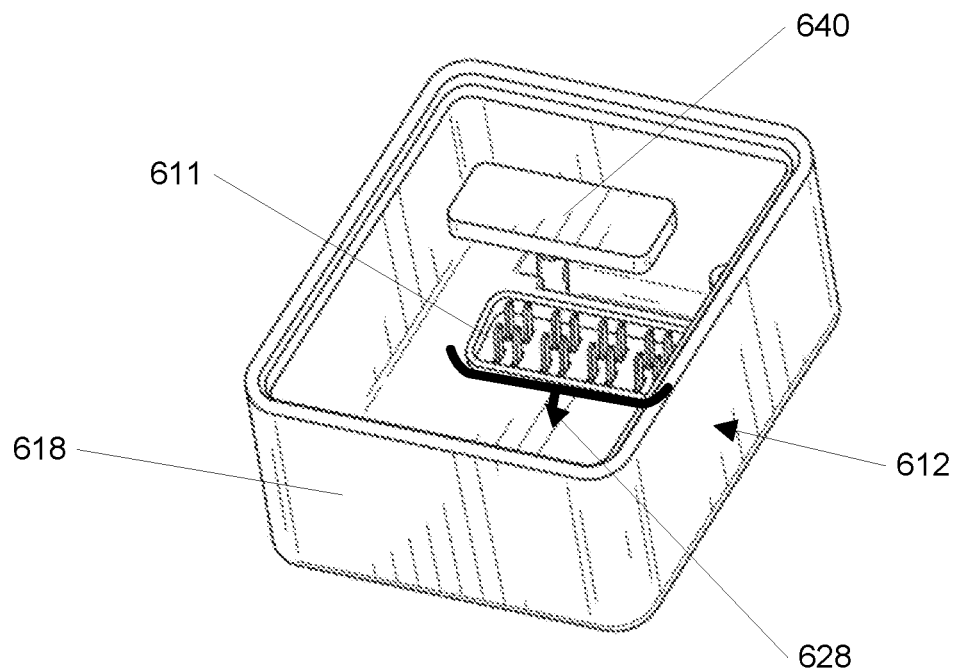
FIGS. 6C and 6D show perspective views of a thermal protection layer of the internal components of the battery pack with battery pack contacts from FIGS. 6A and 6B in accordance with an embodiment.
Figure 6D:
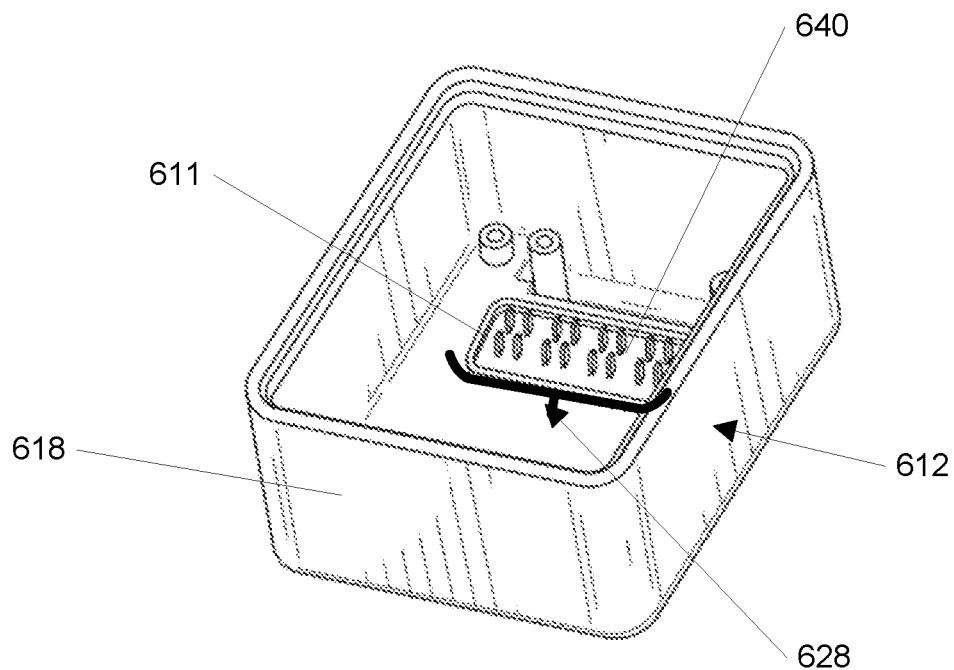

As further illustrated in FIGS. 6C and 6D, the battery pack 600 may include a thermal protection casing 640. The thermal protection casing 640 may be in contact with one or more of the contact pins 628 leading from the battery pack contacts 626 to the circuit board. The thermal protection casing 640 may comprise one or more of: a phase change material, a heat sinking material, thermally conductive potting compound, or other heat absorbing material, or any combination thereof. The thermal protection casing 640 may limit the heat rise across the contact pins 628 that connect the battery pack contacts 626 with the circuit board inside the battery pack housing 610. The thermal protection casing 640 may effectively protect the integrated circuits on the circuit board 629 and may help preserve the capacity of the battery cells within the battery pack 600.

Figure 7:
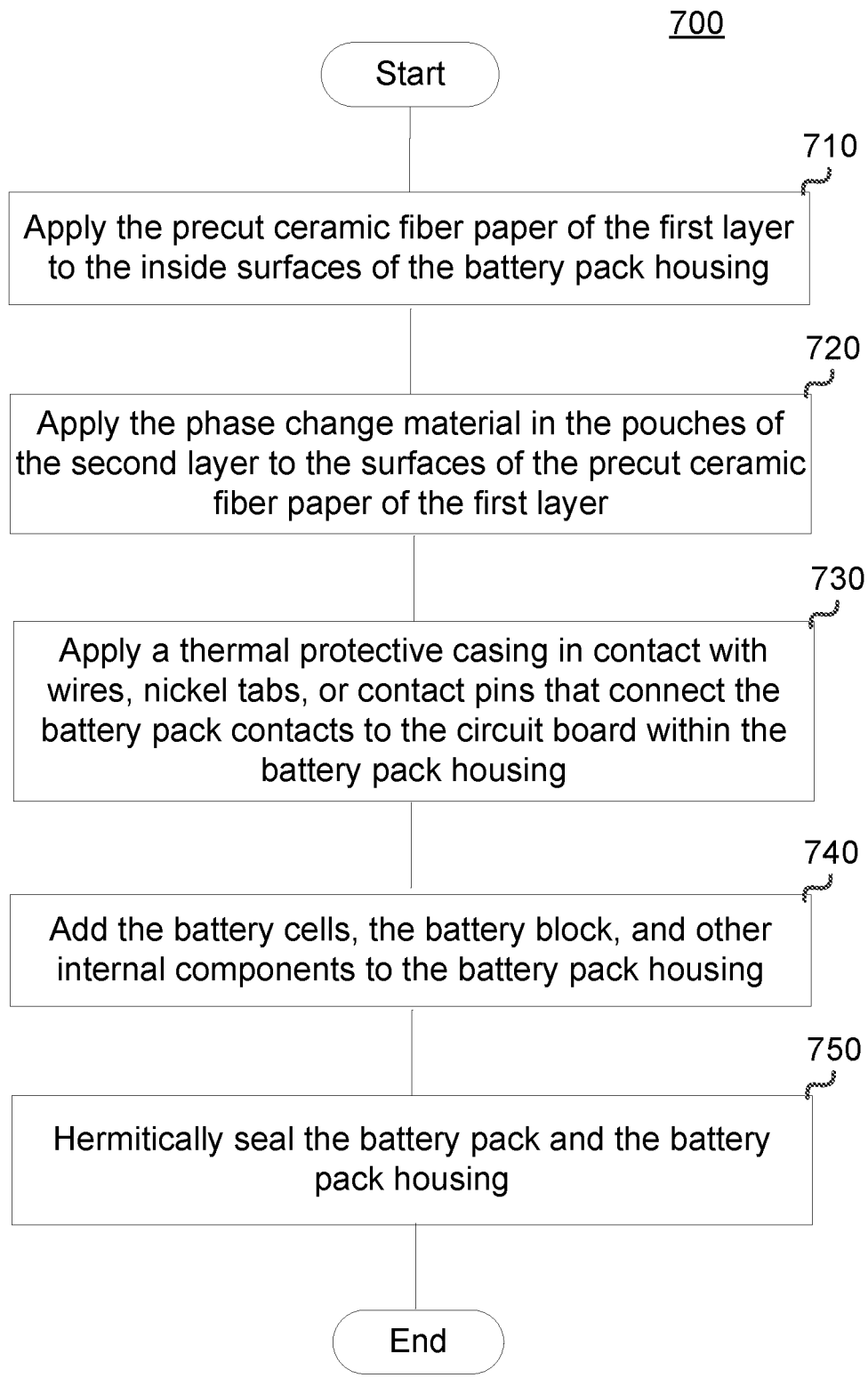
FIG. 7 is a flow chart showing an example method for assembling and/or manufacturing a battery pack from FIG. 1A in accordance with an embodiment.

FIG. 7 is a flow chart showing an illustrative method 700 for assembling and/or manufacturing battery packs of the various types described above. The method of FIG. 7 may be performed for any of battery packs 100, 400, 500, or 600. The steps of the method 700 may comprise, e.g., what is described in connection with the battery packs 100, 400, 500, or 600 in FIGS. 1A-5D. Although various operations shown in FIG. 7 are described as performed for the battery packs 100, 400, 500, or 600, one, some, or all such operations (or parts thereof) may be performed by one or more additional components and/or systems. The order of steps shown in FIG. 7 may be varied, and/or one or more steps may be omitted, and/or one or more steps may be added.

In step 710, a precut ceramic fiber paper of the first layer may be applied to the inside surfaces of the battery pack housing. The precut ceramic fiber paper of the first layer may be applied prior to adding the battery cells, the battery block, and other internal components of the battery pack to the battery pack housing. In step 720, a phase change material in pouches of the second layer may be applied to the surfaces of the precut ceramic fiber paper of the first layer. In step 730, a thermal protective casing may be placed in contact with wires, nickel tabs, or contact pins that connect the battery pack contacts to the circuit board within the battery pack housing. The thermal protective casing may be a phase change material, a heat sinking material, a thermally conductive potting compound, or other heat absorbing material, or any combination thereof. In step 740, the battery cells, the battery block, and other internal components of the battery pack may be added to the battery pack housing. In step 750, the battery pack and the battery pack housing may be hermitically sealed to prevent ingress of the steam of the autoclave during a sterilization cycle.

Many illustrative embodiments are listed below in accordance with one or more aspects disclosed herein. Many of the embodiments listed below are described as depending from various embodiments and the dependencies are not limited and may be depending from any of the embodiments as is described and contemplated by this disclosure. Moreover, that any one or more of the listed embodiments may be incorporated into and/or coalesced and depend from any of embodiments #1, #2, #3 is contemplated by this disclosure.

Embodiment #1. A battery pack configured to prevent overheating of internal components when the battery pack is exposed to a sterilization cycle of an autoclave and configured to electrically power an end device, the battery pack comprising:
  a battery cell holder to hold a plurality of battery cells, each battery cell of the plurality of battery cells fixed within the battery cell holder, wherein the plurality of battery cells is arranged in the battery cell holder in a configuration to form a battery block;
  a battery pack housing that includes a housing cover and a housing base to hold the battery block and internal components of the battery pack, the housing base comprising four outer walls extending perpendicularly from a base;
  a plurality of battery pack contacts electrically connected to a circuit board with a connection element;
  a thermal protection casing in contact with and enclosing the connection element, wherein the thermal protection casing is configured to limit a heat rise across the connection element; and
  a thermal protection portion that comprises a multi-layer portion that encloses the battery block and includes a first layer, a second layer, and an air gap between the second layer and the battery block, wherein the thermal protection portion prevents overheating of the internal components when the battery pack is exposed to a sterilization cycle for the autoclave, wherein the first layer includes a ceramic fiber paper applied to an inner surface of the four outer walls, the base, and the housing cover, and wherein the second layer includes a phase change material layer applied to the first layer opposite the inner surface of the battery pack housing.

Embodiment #2. A battery pack configured to prevent overheating of internal components when the battery pack is exposed to a sterilization cycle of an autoclave and configured to electrically power an end device, the battery pack comprising:
  a battery cell holder to hold a plurality of battery cells, each battery cell of the plurality of battery cells fixed within the battery cell holder, wherein the plurality of battery cells is arranged in the battery cell holder in a configuration to form a battery block;
  a battery pack housing that includes a housing cover and a housing base to hold the battery block and internal components of the battery pack, the housing base comprising four outer walls extending perpendicularly from a base;
  a plurality of battery pack contacts electrically connected to a circuit board with a connection element, the plurality of battery pack contacts configured to electrically connect to power the end device or electrically connect to charge the battery pack;
  a thermal protection casing in contact with and enclosing the connection element, wherein the thermal protection casing is configured to limit a heat rise across the connection element, wherein the thermal protection casing comprises at least one selected from: a phase change material, a heat sinking material, a thermally conductive potting compound, and a combination thereof; and
  a thermal protection portion that comprises a multi-layer portion that encloses the battery block and includes a first layer, a second layer, and an air gap between the second layer and the battery block, wherein the thermal protection portion prevents overheating of the internal components when the battery pack is exposed to a sterilization cycle for the autoclave.

Embodiment #3. A method for assembling a battery pack configured to prevent overheating of internal components when the battery pack is exposed to a sterilization cycle of an autoclave and configured to electrically power an end device, the method comprising:
  applying a first layer of a thermal protection portion to a plurality of inner surfaces of a battery pack housing that includes a housing cover and a housing base to hold a battery block and internal components of the battery pack, wherein the first layer includes a ceramic fiber paper, wherein the battery block includes a battery cell holder to hold a plurality of battery cells, each battery cell of the plurality of battery cells fixed within the battery cell holder, wherein the plurality of battery cells is arranged in the battery cell holder in a configuration to form the battery block, wherein the thermal protection portion prevents overheating of the internal components when the battery pack is exposed to a sterilization cycle for the autoclave;
  applying a second layer of the thermal protection portion to the first layer opposite the plurality of inner surfaces of the battery pack housing, wherein the second layer includes a phase change material layer;

applying a thermal protective casing in contact with and enclosing a connection element that electrically connects the plurality of battery cells to a plurality of battery pack contacts configured to electrically connect to power the end device or electrically connect to charge the battery pack, wherein the thermal protective casing comprises at least one selected from: a phase change material, a heat sinking material, a thermally conductive potting compound, and a combination thereof; and adding the plurality of battery cells, the battery block, and the internal components to the battery pack housing; and hermitically sealing the battery pack housing to prevent ingress into the battery pack of steam of the autoclave during a sterilization cycle.

Embodiment #4. The battery pack, and/or method for assembling the battery pack of any of the preceding Embodiments, wherein the connection element includes a plurality of wires connecting the plurality of battery pack contacts and the circuit board.

Embodiment #5. The battery pack, and/or method for assembling the battery pack of any of the preceding Embodiments, wherein the connection element includes a plurality of clip contacts extending outside the battery pack and connecting the plurality of battery pack contacts and the circuit board.

Embodiment #6. The battery pack, and/or method for assembling the battery pack of any of the preceding Embodiments, wherein the connection element includes a plurality of contact pins that penetrate a wall internal to the battery pack housing, the plurality of contact pins connecting the plurality of battery pack contacts and the circuit board.

Embodiment #7. The battery pack, and/or method for assembling the battery pack of any of the preceding Embodiments, wherein the housing base and the housing cover create a hermetic seal for the battery pack to prevent ingress of steam of the autoclave during the sterilization cycle.

Embodiment #8. The battery pack, and/or method for assembling the battery pack of any of the preceding Embodiments, wherein the second layer includes a plurality of pouches to hold the phase change material layer and the plurality of pouches are applied to the first layer opposite the inner surface of the battery pack housing.

Embodiment #9. The battery pack, and/or method for assembling the battery pack of any of the preceding Embodiments, wherein the plurality of battery pack contacts are configured to electrically connect to power the end device or electrically connect to charge the battery pack.

Embodiment #10. The battery pack, and/or method for assembling the battery pack of any of the preceding Embodiments, wherein the thermal protection casing comprises at least one selected from: a phase change material, a heat sinking material, a thermally conductive potting compound, and a combination thereof.

Embodiment #11. The battery pack, and/or method for assembling the battery pack of any of the preceding Embodiments, wherein the thermal protection casing comprises at least one selected from: a phase change material, a heat sinking material, a thermally conductive potting compound, and a combination thereof.

Embodiment #12. The battery pack, and/or method for assembling the battery pack of any of the preceding Embodiments, wherein the housing base comprises four outer walls extending perpendicularly from a base.

Embodiment #13. The battery pack, and/or method for assembling the battery pack of any of the preceding Embodiments, wherein the first layer includes a ceramic fiber paper applied to an inner surface of the four outer walls, the base, and the housing cover.

Embodiment #14. The battery pack, and/or method for assembling the battery pack of any of the preceding Embodiments, wherein the second layer includes a phase change material layer applied to the first layer opposite the inner surface of the battery pack housing.

Although many of the battery packs described herein reference Lithium ion battery storage chemistry, the disclosure is not so limited. In many instances, a person of ordinary skill in the art will appreciate that other major chemistries for rechargeable batteries may be appropriated substituted without substantially departing from the spirit of the solution: Lithium-ion (Li-ion), Nickel Cadmium (Ni—Cd), Nickel-Metal Hydride (Ni—MH), Lead-Acid, and other chemistries. With some embodiments, the solutions disclosed herein may be included with these technology batteries to provide battery protection, provide improved efficiency, and provide a better user experience than previous battery technologies. Variants of the lithium cobalt cathode, such as nickel cobalt aluminum (NCA) and nickel manganese cobalt (NMC), may be desirable in electric vehicles and other applications.

Other new cathode chemistries, such as lithium manganese spinel (LMO) and lithium iron phosphate (LFP), may be used where appropriate.

We claim:

1. A battery pack configured to prevent overheating of internal components when the battery pack is exposed to a sterilization cycle of an autoclave and configured to electrically power an end device, the battery pack comprising:
   a battery cell holder to hold a plurality of battery cells, each battery cell of the plurality of battery cells fixed within the battery cell holder, wherein the plurality of battery cells is arranged in the battery cell holder in a configuration to form a battery block;
   a battery pack housing that includes a housing cover and a housing base to hold the battery block and internal components of the battery pack, the housing base comprising four outer walls extending perpendicularly from a base bottom, wherein the housing base and the housing cover create a hermetic seal for the battery pack to prevent ingress of steam of the autoclave during the sterilization cycle;
   a plurality of battery pack contacts electrically connected to a circuit board with a connection element;
   a thermal protection casing in contact with and enclosing the connection element, wherein the thermal protection casing is configured to limit a heat rise across the connection element, and wherein the thermal protection casing comprises at least one selected from: a phase change material, a heat sinking material, and a thermally conductive potting compound; and
   a thermal protection portion that comprises a multi-layer portion that encloses the battery block along each of the four outer walls, the base bottom, and the housing cover and includes a first layer, a second layer, and an air gap between the second layer and the battery block, wherein the first layer is approximately 1.5 mm thick, wherein the thermal protection portion is configured to prevent overheating of the internal components when the battery pack is exposed to the sterilization cycle for the autoclave, wherein the first layer includes a ceramic fiber paper applied to an inner surface of each of the four outer walls, the base bottom, and the housing cover, and wherein the second layer includes a phase change material layer applied to the first layer opposite the inner surface of each of the four outer walls, the base bottom, and the housing cover, wherein the second layer includes a plurality of pouches to hold the phase change material layer.

2. The battery pack of claim 1, wherein the connection element includes a plurality of wires connecting the plurality of battery pack contacts and the circuit board.

3. The battery pack of claim 1, wherein the plurality of battery pack contacts are configured to electrically connect to power the end device or electrically connect to charge the battery pack.

4. The battery pack of claim 1, wherein the second layer is approximately 4 mm thick.

5. A battery pack configured to prevent overheating of internal components when the battery pack is exposed to a sterilization cycle of an autoclave and configured to electrically power an end device, the battery pack comprising:
a battery cell holder to hold a plurality of battery cells, each battery cell of the plurality of battery cells fixed within the battery cell holder, wherein the plurality of battery cells is arranged in the battery cell holder in a configuration to form a battery block;
a battery pack housing that includes a housing cover and a housing base to hold the battery block and internal components of the battery pack, the housing base comprising four outer walls extending perpendicularly from a base bottom, wherein the housing base and the housing cover create a hermetic seal for the battery pack to prevent ingress of steam of the autoclave during the sterilization cycle;
a plurality of battery pack contacts electrically connected to a circuit board with a connection element, the plurality of battery pack contacts configured to electrically connect to power the end device or electrically connect to charge the battery pack;
a thermal protection casing in contact with and enclosing the connection element, wherein the thermal protection casing is configured to limit a heat rise across the connection element, wherein the thermal protection casing comprises at least one selected from: a phase change material, a heat sinking material, and a thermally conductive potting compound; and
a thermal protection portion that comprises a multi-layer portion that encloses the battery block along each of the four outer walls, the base bottom, and the housing cover and includes a first layer, a second layer, and an air gap between the second layer and the battery block, wherein the first layer is approximately 1.5 mm thick, wherein the thermal protection portion prevents overheating of the internal components when the battery pack is exposed to a sterilization cycle for the autoclave.

6. The battery pack of claim 5, wherein the connection element includes a plurality of wires connecting the plurality of battery pack contacts and the circuit board.

7. The battery pack of claim 5, wherein the second layer includes a plurality of pouches to hold a phase change material and the plurality of pouches are applied to the first layer opposite an inner surface of the battery pack housing.

8. The battery pack of claim 7, wherein the first layer includes a ceramic fiber paper applied to an inner surface of the four outer walls, the base bottom, and the housing cover.

9. The battery pack of claim 8, wherein the second layer includes a phase change material layer applied to the first layer opposite the inner surface of the battery pack housing.

10. A battery pack configured to prevent overheating of internal components when the battery pack is exposed to a sterilization cycle of an autoclave and configured to electrically power an end device, the battery pack comprising:
a battery cell holder to hold a plurality of battery cells, each battery cell of the plurality of battery cells fixed within the battery cell holder, wherein the plurality of battery cells is arranged in the battery cell holder in a configuration to form a battery block;
a battery pack housing that includes a housing cover and a housing base to hold the battery block and internal components of the battery pack, the housing base comprising four outer walls extending perpendicularly from a base bottom, wherein the housing base and the housing cover create a hermetic seal for the battery pack to prevent ingress of steam of the autoclave during the sterilization cycle;
a plurality of battery pack contacts electrically connected to a circuit board with a connection element;
a thermal protection casing in contact with and enclosing the connection element, wherein the thermal protection casing is configured to limit a heat rise across the connection element, and wherein the thermal protection casing comprises at least one selected from: a phase change material, a heat sinking material, and a thermally conductive potting compound; and
a thermal protection portion that comprises a multi-layer portion that encloses the battery block along each of the four outer walls, the base bottom, and the housing cover and includes a first layer, a second layer, and an air gap between the second layer and the battery block, wherein the second layer is approximately 4 mm thick, wherein the thermal protection portion is configured to prevent overheating of the internal components when the battery pack is exposed to the sterilization cycle for the autoclave,
wherein the first layer includes a ceramic fiber paper applied to an inner surface of each of the four outer walls, the base bottom, and the housing cover, and wherein the second layer includes a phase change material layer applied to the first layer opposite the inner surface of each of the four outer walls, the base bottom, and the housing cover, wherein the second layer includes a plurality of pouches to hold the phase change material layer.

11. The battery pack of claim 10, wherein the connection element includes a plurality of wires connecting the plurality of battery pack contacts and the circuit board.

12. The battery pack of claim 10, wherein the plurality of battery pack contacts are configured to electrically connect to power the end device or electrically connect to charge the battery pack.

13. The battery pack of claim 10, wherein the first layer is approximately 1.5 mm thick.

* * * * *